Aug. 15, 1944.    H. G. BEEDE ET AL    2,355,943

LOCKING ADJUSTING POINT SET SCREW

Filed March 24, 1944

INVENTORS
HERBERT G. BEEDE &
NICHOLAS MONSARRAT
BY
Thomas A. Junckes
ATTORNEY

Patented Aug. 15, 1944

2,355,943

UNITED STATES PATENT OFFICE 2,355,943

LOCKING ADJUSTING POINT SETSCREW

Herbert G. Beede, deceased, late of Jamestown, R. I., by Robert J. Beede, executor, Seekonk, Mass., and Nicholas Monsarrat, Seekonk, Mass., assignors to Pantex Pressing Machine, Inc., Central Falls, R. I., a corporation of Delaware Substituted for abandoned application Serial No. 369,000, December 7, 1940. This application March 24, 1944, Serial No. 527,972

5 Claims. (Cl. 151—32)

This is a substitute application for the previous application No. 369,000 filed December 7, 1940.

The invention relates to improvements in locking adjusting point set screws, particularly of the same general type described in another application No. 368,414 for Locking set screw, filed December 4, 1940, of Herbert G. Beede, one of the joint inventors herein. This application illustrates other modifications of the novel features claimed in said other application and also is directed to supplemental features which may be employed in such a locking set screw for the purpose of adjusting two members movable relative to each other, one having a threaded set screw hole extending to the other. This invention is also particularly useful for adjusting a collar in exact position on a shaft, whether or not said collar includes a gear mounted thereon. Similarly it may constitute a set screw for use in locking a shaft in the desired adjusted position on a machine.

Further features of the invention relate to the additional result of adjusting a movable member relative to a retaining member and securing it thereto in the desired position.

A further object of the invention is to provide such adjusting features in the inherent structure of the set screw itself.

Figure 1:
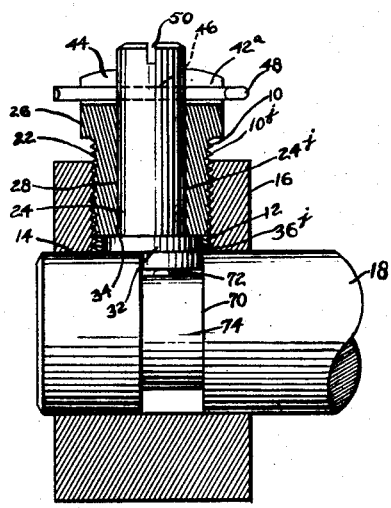
Figure 2:
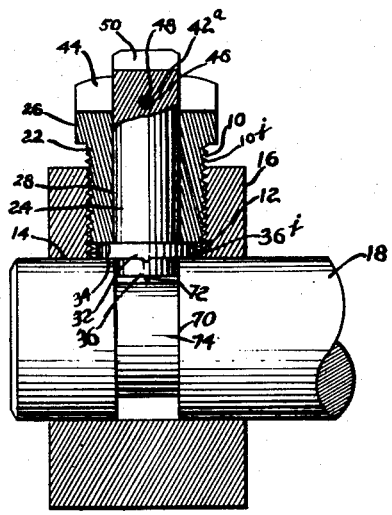
Figure 3:
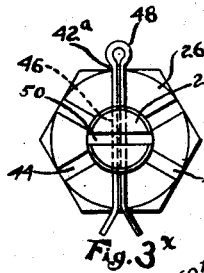
Figure 3:
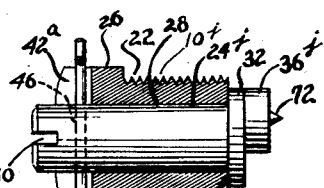
Figure 4:
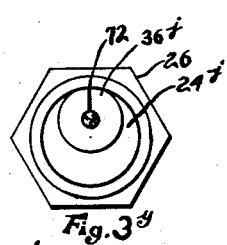
Figure 4:
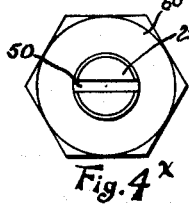
Figure 4:
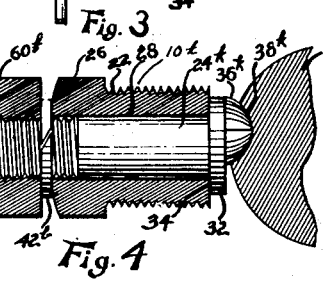

These and such other objects of the invention as may hereinafter appear will be best understood from a description of the accompanying drawing in which:

Fig. 1 is a sectional view of a locking adjusting point set screw, the collar and bolt member shown in vertical section, and the stem member and locking pin in elevation, Fig. 2 is a sectional view similar to Fig. 1, with the eccentric point of the locking set screw turned to adjust the collar to a different position on the shaft, Fig. 3 is an axial sectional view of the locking adjusting point set screw shown in Fig. 1, showing the stem member and locking pin in elevation, Fig. 3$^x$ is a plan view of the set screw shown in Figs. 1–3, Fig. 3$^y$ is a bottom plan view of the set screw shown in Figs. 1–3, Fig. 4 is an axial sectional view similar to Fig. 3 of a modification of the invention showing a different specific type of eccentric point cutting itself a shaped cooperating recess in the shaft member shown in section and employing an alternative type of locking means, Fig. 4$^x$ is a plan view of the set screw shown in Fig. 4, and Fig. 4$^y$ is a bottom plan view of the set screw shown in Fig. 4.

The set screw is first described insofar as it is similar to that described in said other application, and then how it differs to provide the additional function of adjusting a second member relative to a retaining first member and locking it in adjusted position. While the improved type of set screw 10 may be employed for locking any type of a movable member 18 in adjusted position relative to a retaining member 16, it is illustrated in the drawing as employed to lock a shaft 18 in a bore 14 of a collar 16, the set screw having an externally threaded shank 22 within a threaded set screw hole 12 in said collar 16. In both modifications of the invention, the shank 22 has a hollow smooth circular axial bore 28 and a standard type of turning head 26. An inner locking stem member 24 extends through the bore 28 and has an end portion 32 with an upper portion 34 of greater area than said bolt member bore 28 below the threaded end of said bolt member to positively limit the axial upward movement of said stem member 24 relative to said bolt member 22, and means 36 on the lower end thereof for non-rotatably engaging said movable member 18 to restrain relative movement between said movable and retaining members. Means 42 is employed for locking said bolt member 22 to said stem member 24 in the desired adjusted position.

As stated heretofore, in order to adjust a movable member in a retaining member prior to locking it in adjusted position, an end portion having a point or means 36$^j$, as shown in Fig. 3, or 36$^k$, as shown in Fig. 4 is provided, eccentric to the axis of said stem member 24 and set screw, on the lower end of said stem member to engage said movable member prior to being locked in adjusted retained position thereon. In the modification shown in Figs. 1–3, said point or means comprises a cylinder 36$^j$ projecting downwardly from the lower end of said stem member eccentric to the axis of the stem member adapted to register in a circumferential groove 70 in said shaft or movable member 18 to adjust the position of said movable member or shaft 18 relative to said collar or first member 16 by rotation of said stem member and the pointed projection 72 on the lower end of said cylinder to positively engage the reduced portion 74 of said shaft in said groove 70 on further insertion of said bolt member. If desired, however, the modification shown in Fig. 4 may be used, in which case the point itself may be enlarged to comprise a point projection 36ᵏ eccentric to said stem member, projecting downwardly from the lower end of said stem member to directly initially engage said shaft, as shown at 36ᵏ. After an initial engagement of said point 36ᵏ with said shaft, it is obvious that the shaft 18 may be moved relative to the collar 16 on turning movement of the stem member, such as by inserting a suitable screw driver in the slot 50 in the upper end of said stem member and rotating said stem member and then, when the shaft 18 has been moved to the desired adjusted position relative to said collar 16, the entire set screw may be further screwed radially inwardly within said set screw hole 12 to cause the roughened or pointed end 36ᵏ to additionally bite into the shaft 18ᵏ to form its cooperating cavity 38ᵏ to positively engage said shaft or other movable member to prevent movement thereof relative to the retaining member or collar 16. The device is then ready to be locked in position. In the modification shown in Fig. 4, said pointed portion 36ᵏ consists of a dome shaped periphery provided with a plurality of radial teeth 37, although it is obvious that the pointed portion 36ᵏ may assume any suitable shape.

Any suitable type of means may be provided for locking, preferably positively, the bolt member 22 to said stem member 24 in the desired adjusted position. For this purpose a cotter pin 42ᵃ is used and a plurality of diametric slits 44 in the upper surface of the turning head 26 of the bolt member 22, and a diametric hole 46 adjacent to the outer end of said stem member. After the point 36 has engaged the shaft 18, whether it comprises the cylinder 36ʲ registering within the groove 70, or the projection 36ᵏ abutting said shaft, a cotter pin is inserted through the most adjacent diametric slit 44 in the turning head 26, and the diametric hole 46 in said stem member for this purpose aligned therewith. The stem member is rotated to bring it to the initial adjusted position on said shaft 18. As the retaining member 16 becomes adjusted axially of said shaft or movable member on engagement of the point portion 36 of said member, the turning head 26 of the bolt member 22 is further turned to depress said pointed portion or engaging means 36 within said shaft 18 until the diametric hole 46 comes in alignment with a locking slit 44. In place of the cotter pin means, the lock washer 42ᵇ of standard construction may be conveniently inserted between the locking head 26 of the bolt member 22 and the jack nut 60ᶠ which also functions as a lock nut. It is also obvious that if the jack nut 60ᶠ be partially unscrewed on the threaded upper end 65 of said stem member 24 and said jack nut 60ᶠ then rotated jointly with the turning head 26 of said bolt member with the same wrench, then the jack nut 60ᶠ on a later tightening thereof will function to remove the wedge point 36ᵏ from its self-cut cavity 38ᵏ in said shaft to jack said point away from said shaft.

To employ the improved locking adjusting point set screw 10, it is merely necessary to thread it within the recess 12 until the means 36 thereof firmly engages the desired portion of the movable member 18, then, by separate rotation of the stem member by means of a screw driver, the shaft or movable member 18 will be moved axially relative to said collar or retaining member 16 to the desired adjusted position and the entire set screw further threaded to cause further engagement of the pointed portion or engaging means 36 with the movable member for proper alignment of the locking means.

To remove the set screw of Fig. 1, the locking pin 48 is first removed, the outer bolt member 22 unscrewed from its recess 12 and the stem member 24 lifted out of its groove 70, or a supplemental jack nut 60ᶠ may be employed to positively draw the pointed portion out of its respective hole in the manner previously explained.

It is understood that the invention is not limited to the specific embodiments shown and that various deviations may be made therefrom without departing from the spirit and scope of the appended claims.

What we claim is:

1. A set screw for insertion within a threaded set screw hole in a first member extending to a second member movable relative to said first member comprising a threaded bolt having a smooth circular bore and turning means, a smooth stem extending through said bore with an end portion of greater area than said bore beyond the threaded end of said bolt having means projecting eccentrically from the end thereof to be rotated with the stem to engage and move the second member to different positions and means for locking said bolt member to said stem against relative rotation with said eccentric means securing said second member in the desired position.

2. A set screw for insertion within a threaded set screw hole in a first member extending to a second member movable relative to said first member comprising a threaded bolt having a smooth circular bore and turning means, a smooth stem extending through said bore with an end portion of greater area than said bore beyond the threaded end of said bolt having a cylinder projecting axially thereof eccentric to the axis of the stem adapted to register in a circumferential groove in said second member to adjust the relative position of the members, a point projecting from said eccentric cylinder to positively engage the second member on further insertion of said bolt and means for locking said bolt to said stem against relative rotation with said eccentric point securing said second member in the desired position.

3. A set screw for insertion within a threaded set screw hole in a first member extending to a second member movable relative to said first member comprising a threaded bolt having a smooth circular bore and turning means, a smooth stem extending through said bore with an end portion of greater area than said bore beyond the threaded end of said bolt having a pointed projection eccentrically located to engage and move the second member and means for locking said bolt to said stem against relative rotation with said eccentric projection securing said second member in the desired position.

4. A set screw for insertion within a threaded set screw hole in a first member extending to a second member movable relative to said first member comprising a threaded bolt having a smooth circular bore and turning means, a smooth stem extending through said bore with an end portion of greater area than said bore beyond the threaded end of said bolt having a toothed dome shaped projection eccentrically located to engage and move the second member and means for locking said bolt to said stem against relative rotation with said eccentric projection securing said second member in the desired position.

5. A set screw for insertion within a threaded set screw hole in a first member extending to a second member movable relative to said first member comprising a threaded bolt having a smooth circular bore and a turning head, a plurality of diametric slits in the upper surface thereof, a smooth stem extending through said bore with an end portion of greater area than said bore beyond the threaded end of said bolt having means projecting eccentrically from the lower end thereof to engage and move the second member and a diametric hole therein immediately below the upper end and a pin insertable through said hole in said stem and within a selected diametric slit in the turning head of said bolt for locking said bolt to said stem with said eccentric means securing said second member in the desired position.

ROBERT J. BEEDE,
*Executor of the Estate of Herbert G. Beede, Deceased.*

NICHOLAS MONSARRAT.